United States Patent [19]
Wilkinson

[11] Patent Number: 5,666,795
[45] Date of Patent: Sep. 16, 1997

[54] CITRUS HARVESTING MACHINE

[76] Inventor: Stephen Harold Wilkinson, 29 Lakeside Cir., Pahokee, Fla. 33476

[21] Appl. No.: 545,480

[22] Filed: Oct. 19, 1995

[51] Int. Cl.$^6$ .................................................. A01D 46/00
[52] U.S. Cl. .................................................. 56/328.1; 56/330
[58] Field of Search .................................. 56/320.1, 329, 56/330, 14.8

[56] References Cited

U.S. PATENT DOCUMENTS

| | | | |
|---|---|---|---|
| 3,191,369 | 6/1965 | Cowan | 56/14.8 |
| 3,462,930 | 8/1969 | Clark | 56/328.1 |
| 3,561,204 | 2/1971 | Carson | 56/328.1 |
| 3,561,205 | 2/1971 | Baker | 56/328.1 |
| 3,623,306 | 11/1971 | Reynolds et al. | 56/328.1 |
| 3,827,221 | 8/1974 | Chen | 56/328.1 |
| 4,163,356 | 8/1979 | Robbins et al. | 56/328.1 |
| 4,192,125 | 3/1980 | Reynolds et al. | 56/328.1 |
| 4,202,158 | 5/1980 | Edwards | 56/328.1 |
| 4,208,860 | 6/1980 | Edwards | 56/328.1 |
| 4,377,064 | 3/1983 | Peterson | 56/328.1 |
| 4,974,404 | 12/1990 | Korthuis et al. | 56/328.1 |
| 5,027,593 | 7/1991 | Korthuis et al. | 56/328.1 |
| 5,161,358 | 11/1992 | Crukelton | 56/330 X |
| 5,421,146 | 6/1995 | Visser | 56/328.1 |
| 5,428,947 | 7/1995 | Visser | 56/328.1 |

Primary Examiner—Terry Lee Melius
Assistant Examiner—Thomas A. Beach

[57] ABSTRACT

The mechanical harvesting of a citrus crop using a plurality of vertically spaced extending picking arms is disclosed. The means to construct mechanical devices capable of producing various picking patterns are explained with examples given. Specifically detailed is the use of a single power transference to power movement of multiple components which cooperate to provide a desired action. Picking members capable of securely engaging individual citrus fruits are provided which will slidably engage, without damaging, branches of the tree. Multiple picking members on each picking arm are explained. Release means incorporated into the picking members for releasing branches are presented. A method of preventing damage during insertion of the picking arms is provided which provides two levels of impacting protection. Both stationary and continuous advance of the harvester during usage are explained.

18 Claims, 10 Drawing Sheets

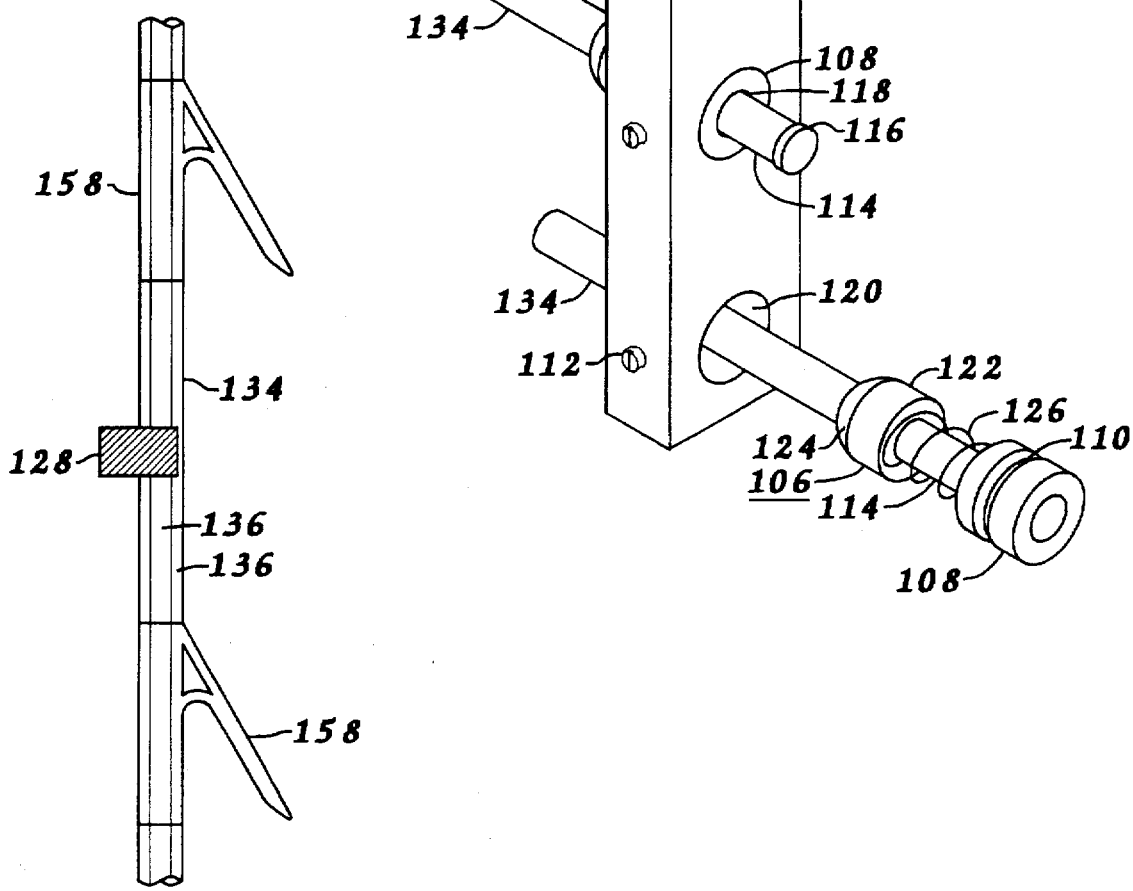

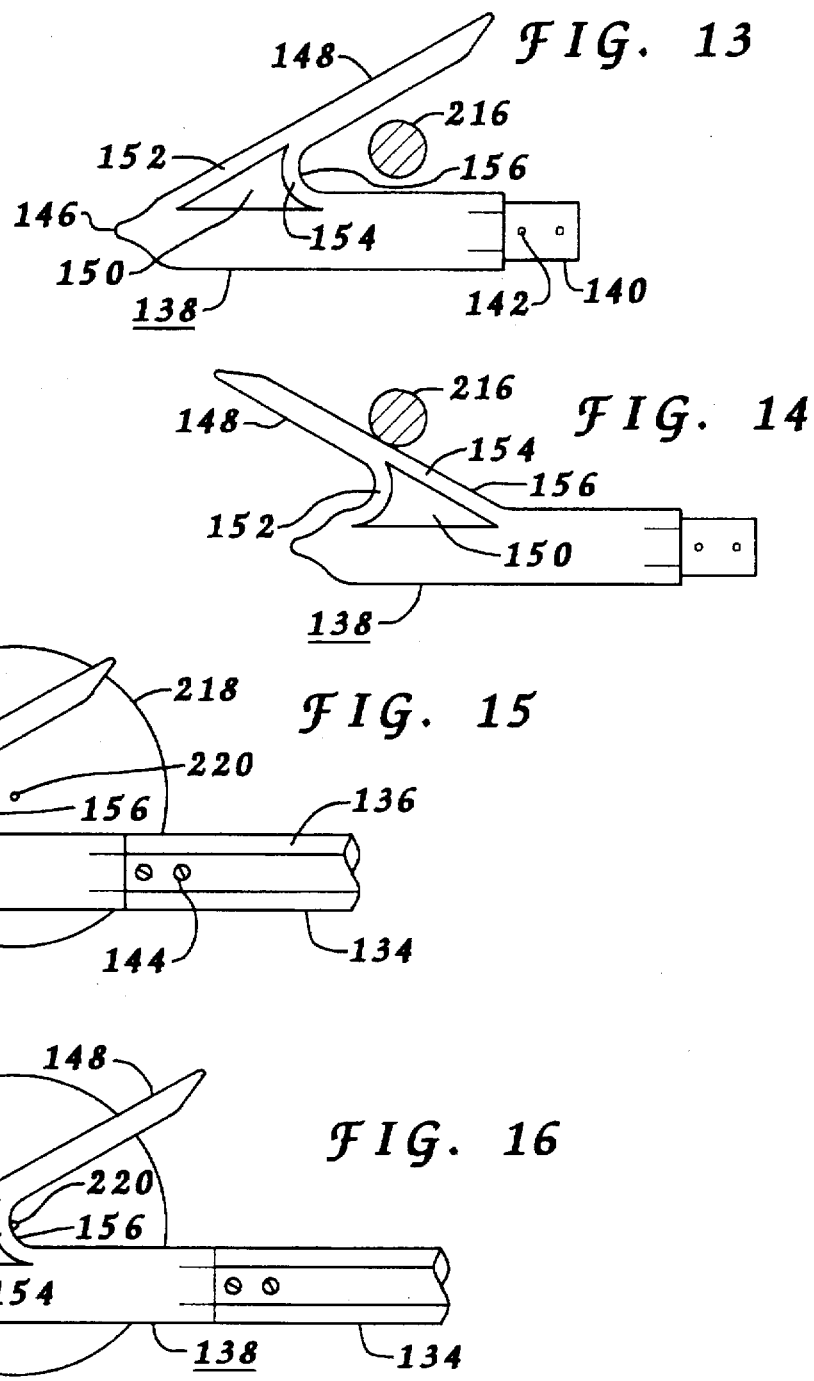

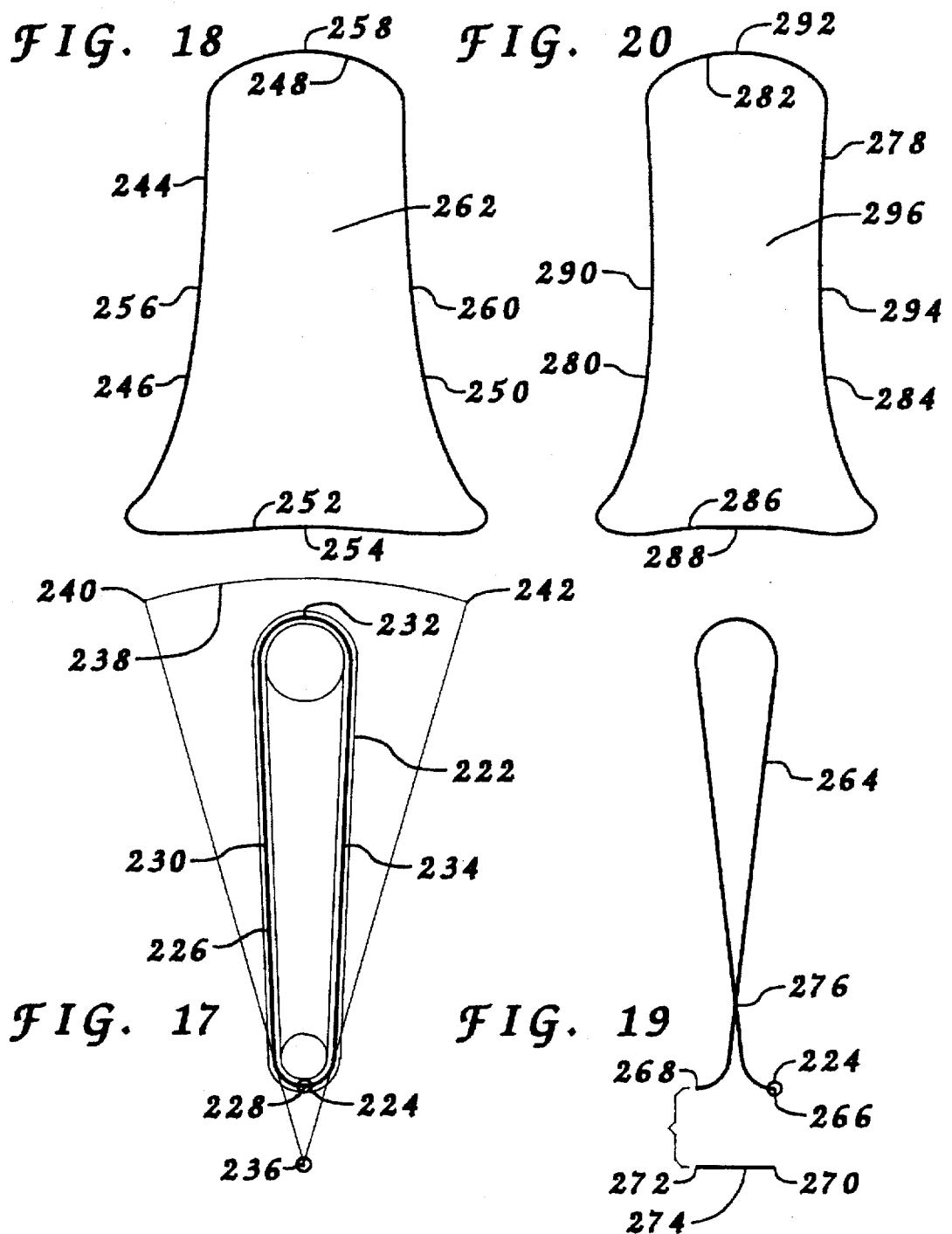

CITRUS HARVESTING MACHINE

BACKGROUND

1. Field of the Invention

Generally the invention relates to mechanically harvesting fruit from trees. More specifically, the invention relates to mechanical generation of motion to move picking arms about the trees to engage the fruit and separate the fruit from the tree.

2. Description of the Prior Art

Advances in mechanical devices in the agricultural field have resulted in significant increases in the ratios of yield verses cost over the past hundred years. Citrus is one crop that has benefited from the inventive process with machines now in use to assist people in the planting and tending phases of citrus production. Machines now clear, level and layout the rows on the land. Automation in the field of irrigation allow control of watering for maximum benefit with a minimum of runoff or evaporation. Machines now apply fertilizer and other chemicals to the groves. Other machines hedge and top the trees allowing more trees per acre than ever before. Following the harvesting of the crop, machines sort, clean, package or otherwise process the fruit. Every step in the production of citrus fruit, or products made from citrus fruit, have been successfully mechanized except harvesting.

Many attempts have been made to provide mechanical means to harvest fruit. Few of these machines are in current commercial use. A machine to harvest fruit must have several qualifying characteristics while eliminating several disqualifying characteristics.

First, the machine must be capable of moving about the grove. Therefore, the machine must be narrow to fit between the rows of trees. The machine must be capable of moving from one row to another. The current layout of citrus groves place the maximum number of trees on the minimum amount of land. Therefore, the vacant land at the end of rows may be small and occasionally bordered by a drainage ditch. It is a requirement that the machine have a sharp turning radius to navigate from one row to another.

Secondly, the machine must be capable of harvesting the fruit from all elevational heights of the tree from the lowest hanging fruit the highest fruit on the tree. Preferable, the machine will only make one pass between each row of trees or, at most, two passes with each pass covering the row of trees on one side. Therefore, the picking action must provide for complete coverage of the tree.

Thirdly, the machine must be capable of harvesting most of the fruit from each tree. The harvesting of the outer and lower fruit is of little commercial value if a great deal of less accessible fruit remains. A higher rate of compensation must be paid to human pickers to pick this remaining fruit due to the increase in difficulty.

There are two major disadvantages associated with mechanical harvesting. The first is damage to the tree. The second is damage to the fruit itself. It is extremely important to avoid both of these results. Damage to the tree can result from breakage or removal of branches or unacceptable removal of leaves. Damage to the fruit includes breakage of the peel where the stem attaches or bruising from unacceptable pressure contact. Another disadvantage to avoid is damage to the grove itself. Examples of this would be excessive movement of earth by the wheels of the machine or damage to the irrigation system.

Various attempts have been made to provide a mechanical harvesting machine meeting the above requirements. These attempts have been less efficient than desired. As such, it may be appreciated that there continues to be a need for a harvesting machine having repetitive picking motion generation, resistance yielding means and release means. The repetitive picking motion generation to provide for production of a series of insertion, contact and withdraw motions to engage and pick the fruit. The resistance yielding means to provide for a prevention of the picking arm from applying pressure to the tree above a certain threshold during the insertion phase. The release means to provide for release of objects when a predetermined pressure threshold is met. The present invention substantially fulfills these needs.

SUMMARY

In view of the foregoing disadvantages inherent in the known types of mechanical harvesters, your applicant has devised a machine having the means to move through the grove parallel to each row of trees. The machine has a plurality of picking arms extending from the machine. The picking arms are vertically spaced one to the next and collectively are adaptable for motion about each tree. The motion comprises an insertion motion into the tree, a gathering motion within the tree to contact branches and a retraction motion to retract the picking arms while contacting the branches. Each picking arm has attached thereto an engaging member. The picking arms engage the branches of the tree and slide outward while in contact with the branches. During this outward movement each engaging member engages branches and allows the branches to slide without impediment through the engaging member. During this movement of the branches through the engaging member, the engaging members securely engages the citrus fruit growing on the branches. Following this engagement of the citrus fruit, pressure builds during outward movement until the citrus fruit is severed from the branch.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposed of the present invention. It is important, therefore, that the claims be regarded as including such equivalent constructions insofar as they do not depart from the spirit and scope of the present invention.

The primary object of the present invention is to provide for the mechanical harvesting of citrus fruit.

Other objects include;

a) to provide for a machine capable of picking fruit while the machine continuously moves along a row of trees.

b) to provide for a plurality of picking arms held in spaced elevational relationship.

c) to provide for movement of the picking arms into and out of trees while the engagement members grasp and pick the fruit in a repetitive cycle.

d) to provide for the speed of the forward advance of the machine to regulate the timing of the repetitive cycle of motions of the picking arms.

e) to provide for a single drive member to generate all the mechanical motions required for the cycle of motions of the picking arms.

f) to provide for a guide member rockably mounted to the machine to slidably engage each picking arm to transfer a unique motion to the picking arms.

g) to provide for an insertion motion to move the picking arms inward on a tree of the row of trees, h) to provide for an engaging motion to bring the picking arms into contact with the branches following the insertion motion.

i) to provide for a retracting motion to move the picking arms outward on the tree of the row of trees following the engaging motion.

j) to provide for an engagement member on each of the picking arms capable of slidably engaging branches to move along the branches to grasp fruit attached thereto during the retracting motion.

k) to provide for release means on the engagement members to release branches during the retracting motion to prevent damage to the tree.

l) to provide for each of the engagement member to be of a one piece hook shaped construction.

m) to provide for reset means on the engagement member to reset the engagement member following usage of the release means.

n) to provide for an overlapping motion of the picking arms to ensure complete coverage of each elevational section of the tree.

o) to provide for insertion pause means to suspend insertion of individual picking arms if moderate resistance is met.

p) to provide for insertion stop means to terminate insertion of individual picking arms if substantial resistance is met.

q) to provide for insertion reset means to reset the affected picking arm following usage of the insertion stop means for normal deployment during the next repetitive cycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 8 is a sectional perspective view of a drive bar as taken from the section line shown in FIG. 2.

FIG. 9 is an overhead plan view of a guide member holding a section of a picking arm.

FIG. 13 is an overhead plan view as taken from the section line shown in FIG. 2.

FIG. 14 is an overhead plan view of the picking member shown in FIG. 13 in an alternative position.

FIG. 15 is an overhead plan view of the picking member shown in FIG. 13 beginning to engage a fruit.

FIG. 16 is an overhead plan view of the picking member shown in FIG. 15 engaging the fruit.

FIG. 17 is an overhead plan view representing a motion pattern of a drive belt.

FIG. 18 is an overhead plan view representing a pattern associated with the motion pattern represented in FIG. 17.

FIG. 19 is an overhead plan view representing a motion pattern associated with the motion pattern represented in FIG. 17 during advancing motion.

FIG. 20 is an overhead plan view representing a pattern associated with the motion pattern shown in FIG. 19.

DESCRIPTION

Overview

Figure 1:
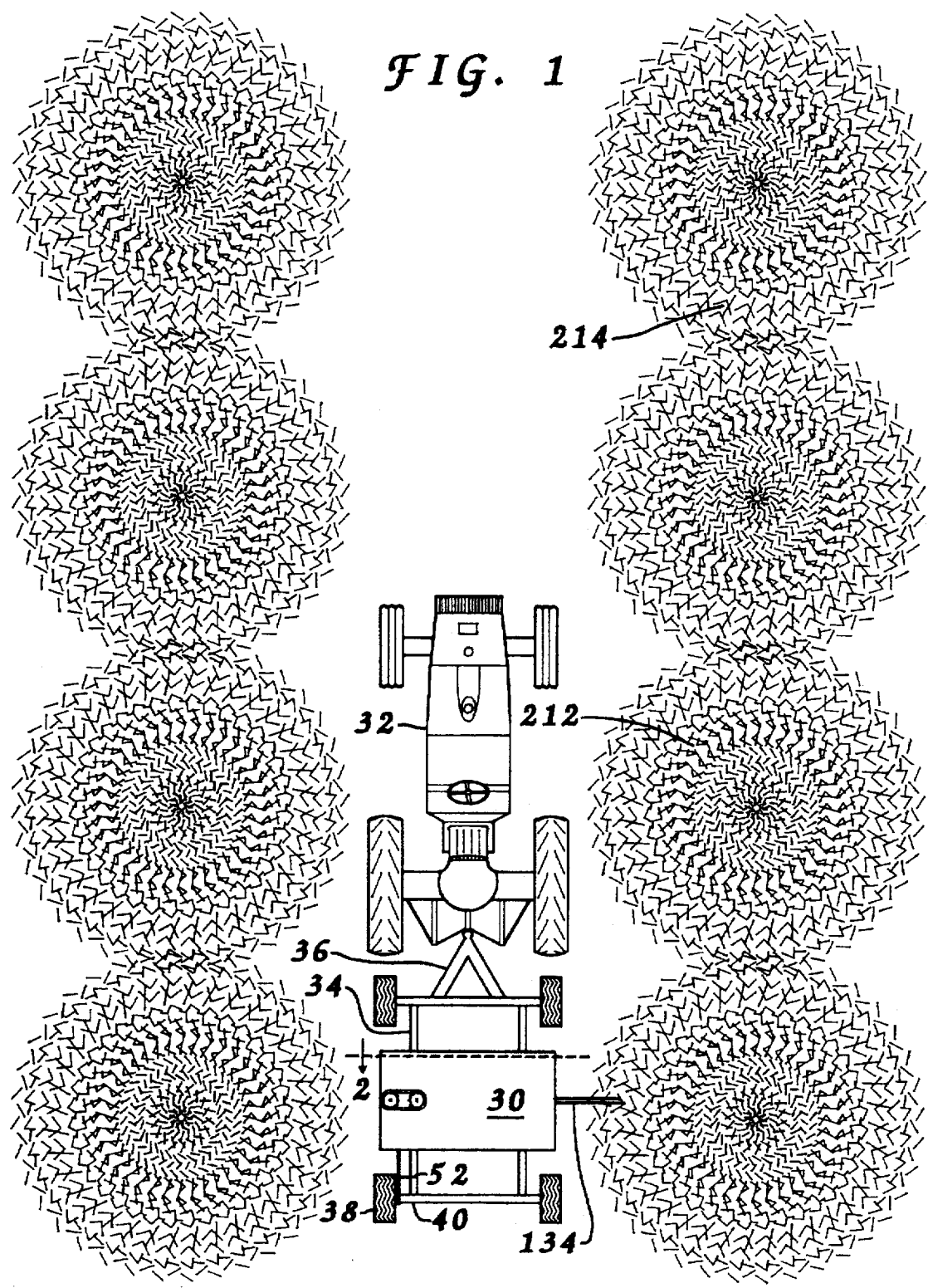
FIG. 1 is an overhead plan view of a harvester in a section of a grove.

Generally there are four requirements for a harvester having features of the present invention. The first is providing movement of the harvester about a grove of citrus trees during usage. The second is providing picking arms capable of penetrating the citrus trees during usage. The third is providing for movement of the picking arms about the citrus trees during usage. The fourth is to provide for picking members to engage the citrus fruit to apply a picking pressure during the movement of the picking arms about the citrus trees. These four requirements will be discussed separately below with reference to the drawings where like reference numerals refer to like parts throughout the various views.

Movement of the harvester

There are two general methods of moving through the grove. The first, and the preferred method, provides for a slow continuous movement through the grove during the harvesting. During this motion the harvester may be self regulating to control a picking action based upon the pace of the harvester, as detailed below. Alternatively, the operator may, through a visual inspection of the approximate percentage of fruit being harvested, manually control the pace of the harvester. The second method provides for pausing the harvester adjacent each individual tree while the harvester operates upon the tree. This method provides for operator control over the percentage of fruit harvested by allowing a greater quantity of time to be spent on certain trees. Slight repositioning of the harvester is possible during this method to ensure complete coverage of the target tree for optimum picking of the subject fruit.

FIG. 1 depicts a harvester 30 capable of mechanical harvesting of a citrus crop from trees 212 situated in a row 214. Movement of harvester 30 may be generated by a power source mounted directly thereon. A tractor 32 pulls harvester 30 using a coupling 36. Harvester 30 is mounted to a support frame 34 which connects to axles 40. Each axle 40 has wheels 38 attached at opposing ends.

Picking arms

During harvesting it is necessary to penetrate each tree for engagement of the fruit growing on the tree. A plurality of elongated shafts are held in spaced elevational relationship. This configuration allows movement of the shafts within the tree while allowing passage of branches between adjacent shafts without damage to the branches. There should be no connection of the individual shafts where the connection will penetrate the tree canopy. Such extensions penetrating the tree may damage the tree during movement about the tree.

Numerous patterns exist including a single row having uniform spacing between adjacent sets of shafts, as shown. Alternatively, use of a plurality of sets of shafts in a horizontally spaced manner is possible. With this sort of configuration it is not necessary that sets operate in close proximity. Each set may be regulated to cover a certain relational position on the tree. It may take several cycles before the cooperation is apparent. A uniform elevational coverage pattern is obtainable by varying the elevation relationship of one set to any other sets.

The growth of fruit is such that it densely exists near the outer periphery of the tree where sunlight is abundant. Each set may have a separate penetration depth distinct from the penetration depth of the other sets. This configuration provides for more picking action occurring at the outer periphery of the tree for a more uniform coverage of the tree.

Figure 2:
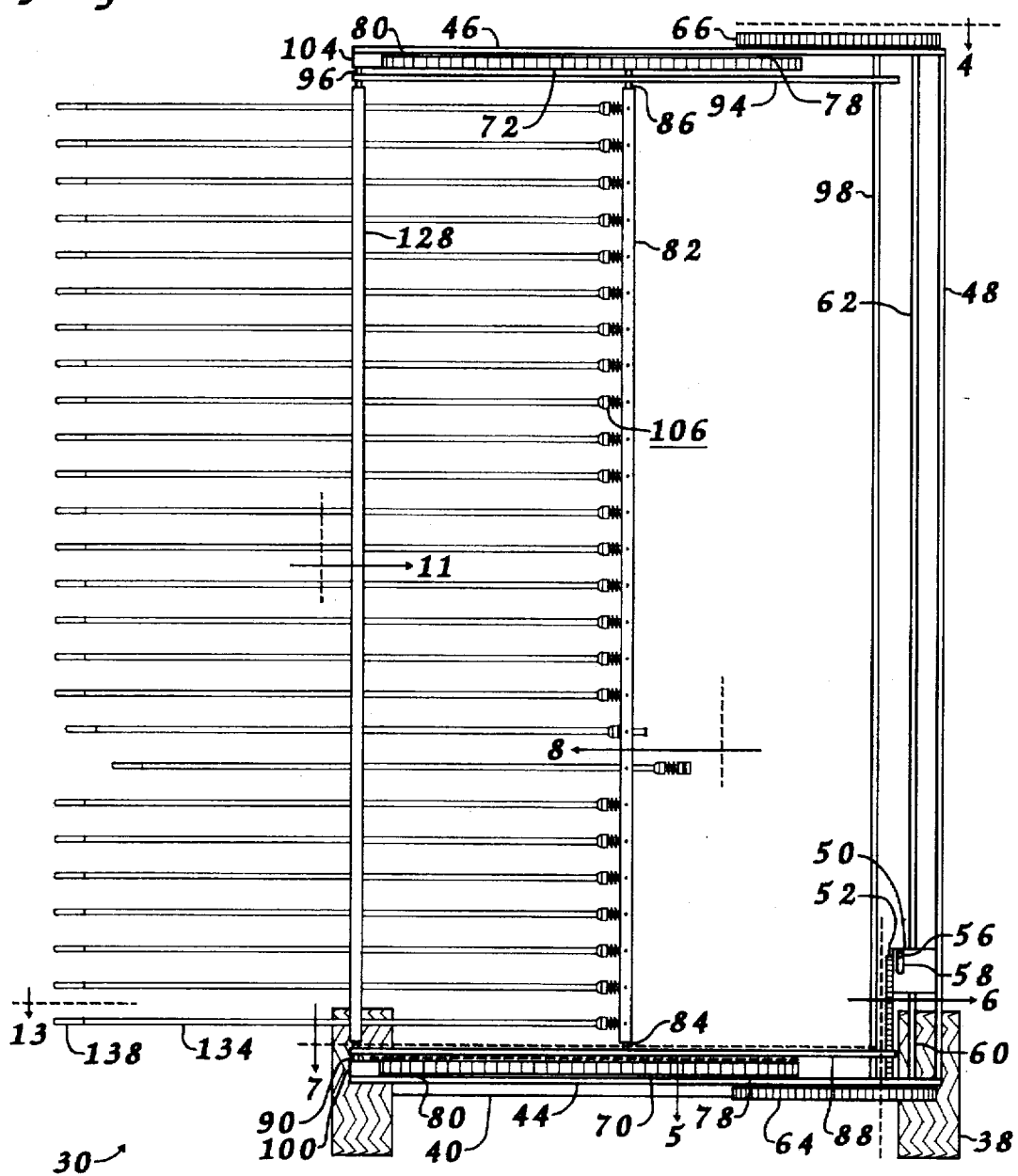
FIG. 2 is a front plan view of the harvester as taken from the section line shown in FIG. 1.

FIG. 1 illustrates penetration of tree 212 by a picking arm 134 extending from harvester 30. FIG. 2 illustrates a uniform spacing between adjacent picking arms 134. A drive bar 82 carries picking arms 134 for movement relative to harvester 30 while providing for a principal contact with picking arms 134. Picking arms 134 penetrate and are withdrawn from tree 212 because of movement of drive bar 82. During penetration each picking arm 134 is subject to striking a branch of tree 212 and meeting resistance. When such an obstruction is met, if picking arm 134 continues penetration, damage may be inflicted upon tree 212. An impact absorbing member 106 prevents such damage.

Impact absorbing member 106, shown in FIG. 2 and FIG. 8, provides for two levels of relief. FIG. 8 illustrates three positions of picking arm 134 relative to drive bar 82. The upper picking arm 134 is shown in a normal deployment position as exists during normal operation. The center picking arm 134 is shown following initial contact. The lower picking arm 134 is shown in full release.

Immediately upon contact an impact spring 126, held between an anchoring member 108 and a reset guide member 122, compresses to absorb the force of the impact. During this compression an impact shaft 114 extends through anchoring member 108. If picking arm 134 becomes free of the obstruction during this time, picking arm 134 will return to the normal deployment position without interruption of a picking cycle. A locking member 116 seats within a locking member seat 118 to prevent release of picking arm 134 through drive bar 82.

If continued resistance occurs, anchoring member 108 receives additional pressure from picking arm 134. When a predetermined threshold of pressure is obtained, anchoring member 108 is forced rearward out of an aperture 120 and picking arm 134 becomes free to not advance with drive bar 82. Anchoring member 108 has a seating groove 110 which cooperates with a displaceable engager, not shown, housed within drive bar 82. This displaceable engager is controllable by a pressure set screw 112. Adjustment is made to pressure set screw 112 to set a pressure release level.

Following completion of a cycle, explained below, anchoring member 108 remounts within aperture 120 of drive bar 82. During retraction of drive bar 82, relative to harvester 30, all displaced anchoring members 108 meet a stationary item. Once contact is made, pressure builds to bring reset guide member 122, with a tapered surface 124 guiding, into a normal set position within aperture 120.

Figure 10:
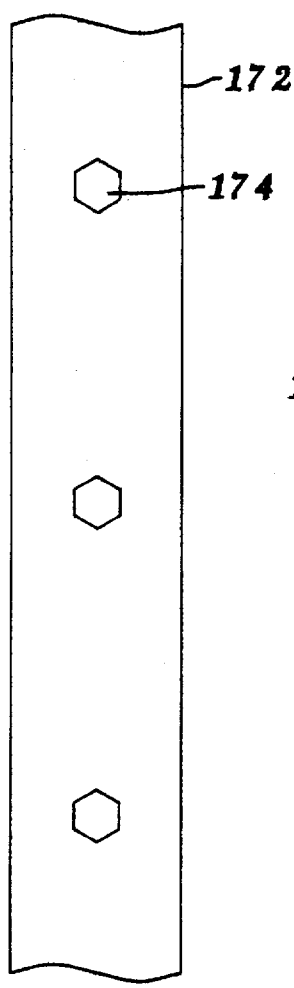
FIG. 10 is a sectional front plan view of a guide member.
Figure 11:
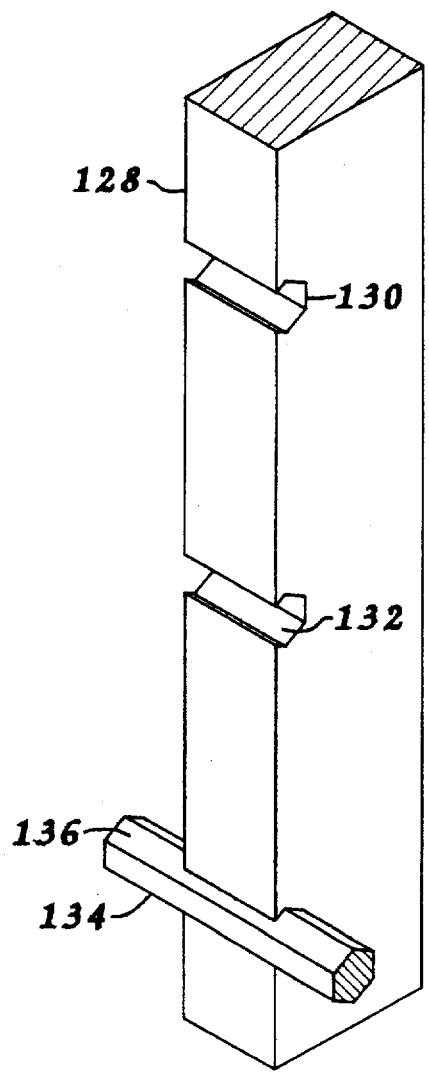
FIG. 11 is a sectional perspective view of a second embodiment of a guide member as taken from the section line shown in FIG. 2.
Figure 12:
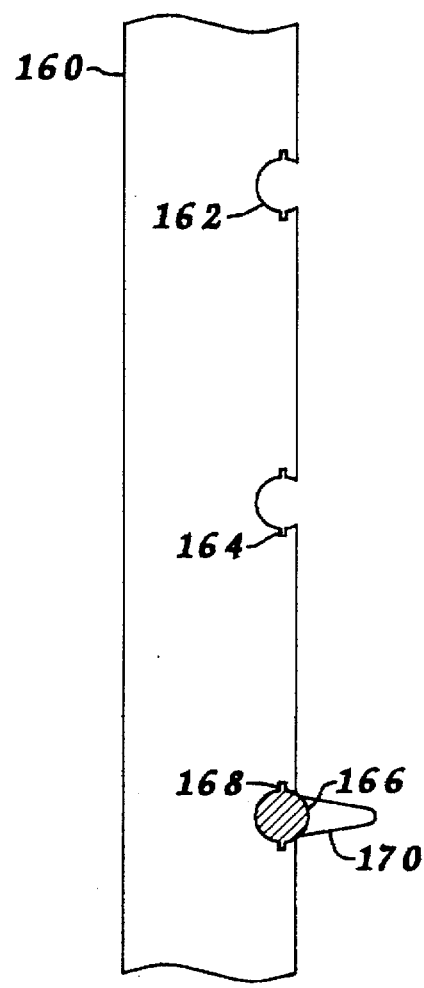
FIG. 12 is a sectional front plan view of a third embodiment of a guide member.

The principal contact for the picking arms is provided by drive bar 82 which secures one end of the picking arms during usage. A second contact point along the picking arms ensures true movement of the picking arms and to provide leverage during the engagement motion detailed below. Many secondary contacts possibilities exist. Preferably the secondary contact is a slidable mount, although a second movable drive bar is possible. Referring to the slidable mount, as shown in FIG. 10, a complete enclosure is possible. Open engagements allow attachments on the picking arms to pass the secondary contact, as shown in FIG. 9, FIG. 11 and FIG. 12. This open engagement allows the deployment of multiple picking members, detailed below, on each picking arm.

A guide member 128 provides a secondary contact with picking arms 134 and cooperate with drive bar 82 to hold picking arms during the picking motion more particularly detailed below. Guide member 128 contain a plurality of picking arm guides 130. Each picking arm guide 130 accepts one picking arm 134. Each picking arm guide 130 slidably receives one picking arm 134 which may move within picking arm guide 130 from one end of picking arm 134 to the opposing end.

As detailed below, each picking arm will have attached thereto at least one picking member. The picking member must extend substantially horizontally to properly engage fruit. Picking arm 134 may be of a construction so that it has a plurality of planar surfaces 136, shown in FIG. 11. These planar surfaces 136 cooperate with planar surfaces 132 of picking arm guide 130 to prevent rotation therein. As shown in FIG. 9, picking arm 134 may have plurality of in line picking members 158 extending therefrom. Guide member 128, having an open engagement, permits passage of guide member 128 by in line picking members 158. Alternatively, a guide member 160 may have a plurality of picking arm guides 162 each having at least one pivotal guide slot 164. Pivotal guide slot 164 would cooperate with rotation locking extensions 168 on a picking arm 166 to prevent rotation of a picking member 170.

While the above two embodiments allow passage of the guide member by picking members certain configurations require only one picking member extending from the distal end of the picking arm while still requiring rotation prevention. As shown in FIG. 10, a guide member 172 may have a plurality of picking arm apertures 174 which are closed and do not allow passage of attachments extending from the respective picking arms.

Movement of the picking arms

During usage it is necessary to provide for an insertion of the picking arms into the tree, a displacement of the picking arms within the tree and a retraction of the picking arms following the displacement. Many mechanical structures may impart the proper motion to the picking arms. An illustration, using a specific embodiment, explains the general principal of cyclical motion. No limitations to the specific examples should be inferred, as many other configurations exist.

The specific requirement of depth of penetration varies from tree to tree. This is partly due to most of the fruit being on the outer limits of the tree where sunlight is plentiful. In mature groves, where the trees are full with considerable overlapping between adjacent trees, there is relatively little fruit near the center line of the row. In less mature groves there may be a great deal of fruit within this region.

While the above description indicates a sequence of events, being insertion, displacement and retraction, generally there will be a slight overlap of these steps. It is best to have a smooth transition from one directional motion to the next. Therefore, as one example, there may be some additional insertion during the beginning of the displacement phase and a beginning of retraction before completion of the displacement phase.

It is not a requirement, but it is desirable, to completely remove the distal ends of the picking arms from within the tree between cycles. This removal significantly reduces striking damage during advance of the picking arms before beginning a new cycle.

The harvester will cycle through a pattern of insertion, displacement, retraction and repositioning in any of the configurations whether stationary or in constant motion. It is required to provide mechanical structures to generate these motions. The embodiment shown provides for a single power transference to control cyclical motion which operates to cause all of the desired motions of the picking arms. Alternatively, separate power supplies, or splinter power transference, may operate to manipulate the separate mechanical structures.

Many patterns of motion for the picking arms are possible. Two examples are given along with specific dimensions for construction of harvester 30. These examples are only given to provide a basic concept of the principle of the invention. The illustrations of specific structure shown in FIG. 1, FIG. 2, FIG. 5, FIG. 7 will produce a picking pattern having completely overlapping coverage. During each cycle of the picking arms a certain travel distance of the machine will occur. The picking pattern will have a measurement, at the narrowest point within the pattern proper, of at least twice this travel distance. Using the specific dimensions given, for every twelve, (12), inches of forward travel of harvester 30 the resultant picking pattern will have a minimum measurement parallel to the line of travel, excluding the areas immediately adjacent the opposing ends, of twenty-four, (24), inches. This overlapping coverage provides for a first and second coverage of each area of the tree.

Many other structural configurations may produce similar patterns. It is possible to provide for patterns which completely overlap only on the outer periphery of the tree, where the fruit is the densest. Other structural configurations will produce patterns providing for complete coverage of the tree without any substantial overlapping.

The specific example given employ direct transference of motion via rotation shafts, gears, chains and pivotal assemblies. Other structures exist to provide such direct transfer including shafts having threads. Use of other drives, as exampled by electric motors, hydraulic drives or pneumatic drives, will provide the proper control over various moveable assemblies. Suitable substitution of equivalent components are envisioned and herein disclosed.

Harvester 30 requires power to operate certain movable structures. Drive bar 82 must move back and forth laterally to tree 212. Simultaneously, guide member 128 must operate to properly align picking arms 134 for the cycle of motions. Any of the conventional methods known in the art may provide this power. With a separate power supply, the passage of harvester 30 relative to trees 212 may regulate the timing of the movement of the structures. A particularly expedient method of powering the movable structures of harvester 30 is to provide for the movement of harvester 30 within the grove to generate the power. With proper ratio transference, this provides for uniform cycling of the structures relative to movement of harvester 30.

Figure 6:
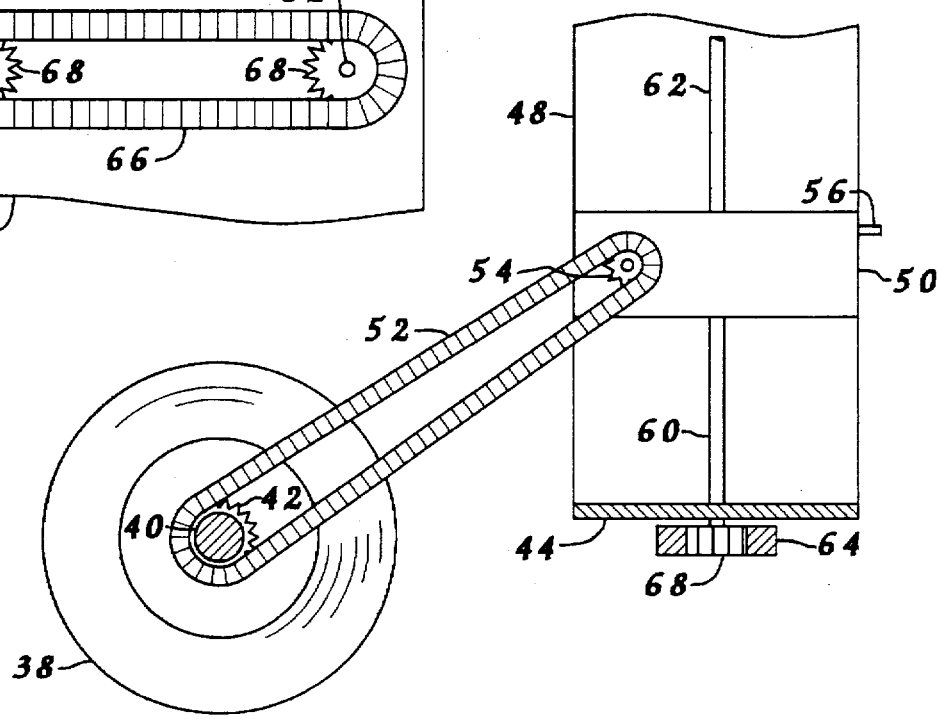
FIG. 6 is a side plan view as taken from the section line shown in FIG. 2.

One such transfer method is to have a power transfer chain 52, shown in FIG. 1, FIG. 2 and FIG. 6, transfer rotation from wheels 38. This transfer is from axle 40 through an axle gear 42 to a power transfer unit gear 54 to a power transfer unit 50. Power transfer unit 50 then transfers rotation from power transfer unit gear 54 to cause rotation of a lower transfer shaft 60 and an upper transfer shaft 62 by any of the conventionally known methods. An engagement lever 56, has two positions within an engagement slot 58. The user may select to prevent transference of power during movement of harvester 30. In this manner transport of harvester 30 may occur without performance of the picking action.

Lower transfer shaft 60 and upper transfer shaft 62 act to transfer rotation to assemblies at the bottom and top of harvester 30. This transfer is made outside the limits of movement of the upper and lower assemblies and the assembly carrying picking arms 134.

Lower transfer shaft 60 and upper transfer shaft 62 now rotate based upon the speed of harvester 30 movement along row 214. Conversion of this rotation now occurs to generate a cyclical motion to picking arms 134. The various structures of the upper extent and the lower extent of harvester 30 which drive the cyclical motion of picking arms 134 are identical and operate in a synchronized manner.

Referring now to FIG. 2, FIG. 4, FIG. 5 and FIG. 7, lower transfer shaft 60 passes through a lower frame plate 44 and transfers rotation to a power transfer gear 68. Rotation of power transfer gear 68 causes rotation of a lower coupling chain 64 which transfers rotation to an opposing power transfer gear, not shown. This power transfer gear then transfers rotation to a transfer shaft 78 which transfers rotation back through lower frame plate 44 to a rearward drive gear 76. Rearward drive gear 76 cooperates with a forward drive gear 74 to transfer rotation to a lower drive chain 70. Forward drive gear 74 is rotatably secured to lower frame plate 44 by a support shaft 80. Lower drive chain 70 has extending upward therefrom, and securely affixed thereto, a lower anchor 84. Lower anchor 84 travels with and follows the path of lower drive chain 70 during rotation of lower drive chain 70 repetitively around forward drive gear 74 and rearward drive gear 76. Thus, lower anchor 84 rotates repetitively.

Similarly upper transfer shaft 62 passes through an upper frame plate 46 and transfers rotation to power transfer gear 68. Rotation of power transfer gear 68 causes rotation of an upper coupling chain 66 which transfers rotation to an opposing power transfer gear 68. This power transfer gear 68 then transfers rotation to transfer shaft 78 which transfers rotation back through upper frame plate 46 to a rearward drive gear, not shown. Rearward drive gear cooperates with a forward drive gear, not shown, to transfer rotation to an upper drive chain 72. Forward drive gear is rotatably secured to upper frame plate 46 by support shaft 80. Upper drive chain 72 has extending downward therefrom, and securely affixed thereto, an upper anchor 86. Upper anchor 86 travels with and follows the path of upper drive chain 72 during rotation of upper drive chain 72 repetitively around forward drive gear and rearward drive gear. Thus, upper anchor 86 rotates repetitively.

Lower frame plate 44 and upper frame plate 46 cooperate with a frame wall 48 to provide structural integrity to harvester 30. Installation of opposing side cover plates, not shown, cover and protect the mechanical components within harvester 30 while enhancing the structural integrity of harvester 30.

Lower anchor 84 and upper anchor 86 repetitively travel around on their respective lower drive chain 70 and upper drive chain 72 in a matching and synchronized manner. As mentioned previously, separate power transference, or even separate power supplies, can act to control the motion of drive bar 82 and guide member 128. The embodiment illustrated uses the synchronized motion of lower anchor 84 and upper anchor 86 to control and power the motions of drive bar 82 and guide member 128.

Figure 7:
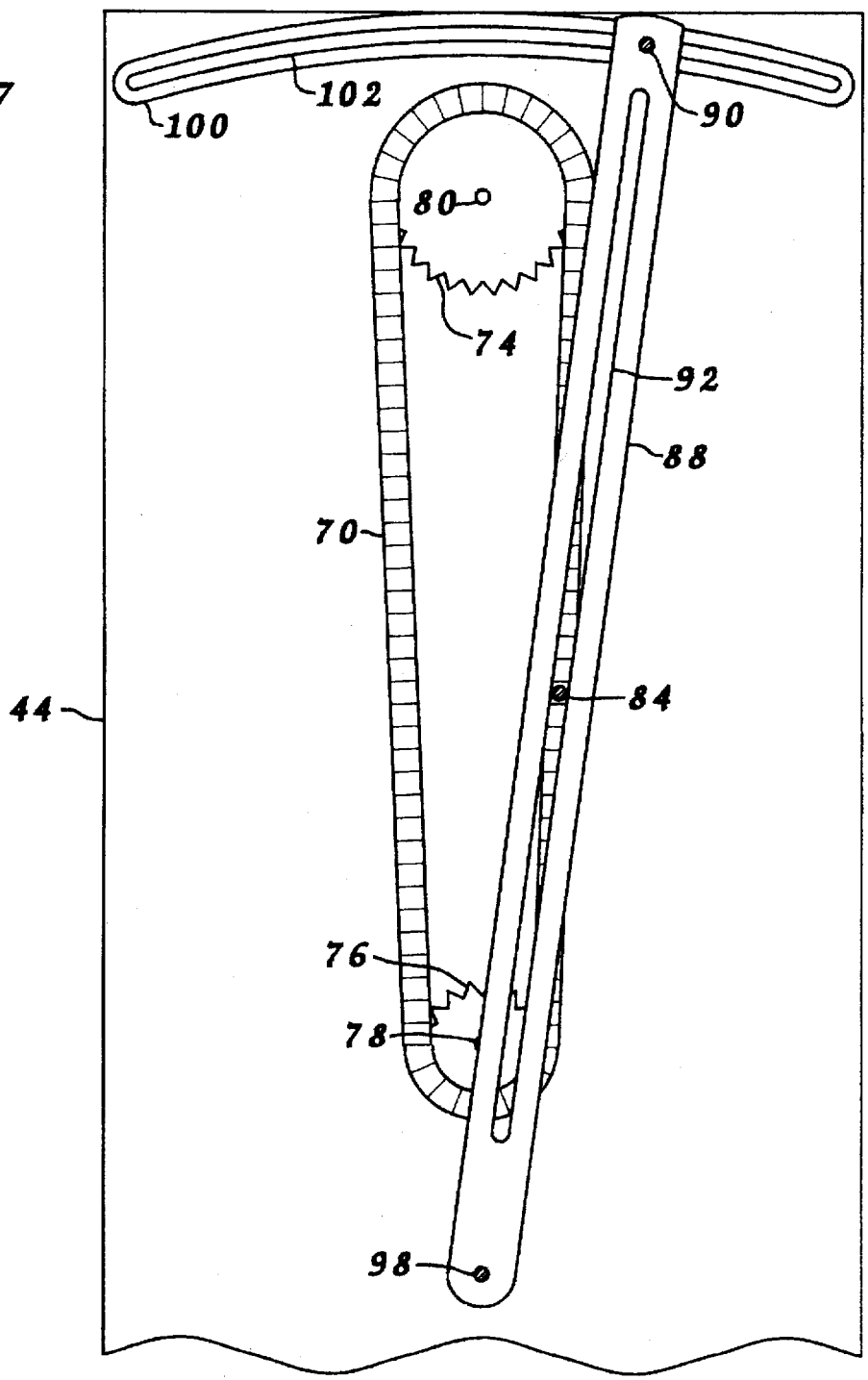
FIG. 7 is an overhead plan view as taken from the section line shown in FIG. 2.

Referring now to FIG. 2 and FIG. 7, this transference produces a stationary pattern 244, shown in FIG. 18 and a cycling pattern, shown in FIG. 20. The lower assembly is shown in FIG. 7, with the understanding that a similar upper assembly operates similarly.

As previously disclosed, lower anchor 84 moves with the passage of lower drive chain 70. During this repetitive cycling motion, lower anchor 84 slides along within a guide channel 92 which longitudinally penetrates a lower pivot member 88. Lower anchor 84 extends upward beyond the upper extent of lower pivot member 88. Lower pivot member 88 is pivotally secured to lower frame plate 44 at one end by a pivot anchor 98. Secured rigidly to the opposing end of lower pivot member 88 is a lower sliding anchor 90. Lower sliding anchor 90 penetrates lower pivot member 88. A lower track 102, of a lower track housing 100, restricts movement of the lower extent of lower sliding anchor 90. Thus, as lower anchor 84 moves it causes lower pivot member 88 to move causing lower sliding anchor 90 to slide along lower track 102.

Thus, a single power transference drives lower anchor 84 in an elongated pattern forward and back longitudinally on lower frame plate 44. Simultaneously this motion cause lower sliding anchor 90 to move laterally across lower frame plate 44. Lower sliding anchor 90 and lower anchor 84 always remain aligned with pivot anchor 98 during the generation of the repetitive cyclical motion.

Similarly, upper anchor 86 moves with the passage of upper drive chain 72. During this repetitive cycling motion, upper anchor 86 slides along within a guide channel, not shown, which longitudinally penetrates an upper pivot member 94. Upper anchor 86 extends downward beyond the lower extent of upper pivot member 94. Upper pivot member 94 is pivotally secured to upper frame plate 46 at one end by pivot anchor 98. An upper sliding anchor 96 is rigidly secured to the opposing end of upper pivot member 94. Upper sliding anchor 96 penetrates upper pivot member 94. An upper track, not shown, of an upper track housing 104, restricts the upper extent of upper sliding anchor 96. Thus, as upper anchor 86 moves it causes upper pivot member 94 to move causing upper sliding anchor 96 to slide along within upper track housing 104.

Thus a single power transference drives upper anchor 86 in an elongated pattern forward and back longitudinally on upper frame plate 46. Simultaneously, upper sliding anchor 96 moves laterally across upper frame plate 46. Upper sliding anchor 96 and upper anchor 86 always remain aligned with pivot anchor 98 during the repetitive cyclical motion.

Following this generation of a synchronized motion of lower anchor 84 and upper anchor 86 and lower sliding anchor 90 and upper sliding anchor 96 transference of these motions to move picking arms 134 must occur. Drive bar 82 is rotatably secured at the lower and upper extent to lower anchor 84 and upper anchor 86 respectively. These securements occur after lower anchor 84 passes through lower pivot member 88 and after upper anchor 86 passes through upper pivot member 94. Guide member 128 is secured at the lower and upper extent to lower sliding anchor 90 and upper sliding anchor 96 respectively. These securements occur on the upper side of lower pivot member 88 and the lower side of upper pivot member 94.

During motion drive bar 82 will move toward guide member 128 while guide member gradually moves toward the center. Then while drive bar 82 moves away from guide member 128 guide member 128 gradually moves away from center while continuing in the same direction. When drive bar 82 nears and passes the farthest distance away from guide member 128 guide member 128 will rapidly move from one lateral extend to the other side. Repetitive performance of this cycle occurs.

This cyclical motion, more particularly disclosed below, results in the production of a picking pattern wherein picking arms 134 are inserted, displaced, retracted and reset. Insertion of picking arms 134 preferably is relatively straight into tree 212. Displacement of picking arms 134, following this insertion, occurs to engage and gather branches of tree 212. Retraction of picking arms 134 preferably is relatively straight, while continuing to contact the branches of tree 212.

Picking members

During the cyclical motion of the picking arms, picking members will attempt to engage citrus fruit. Following this engagement, the picking member will impart a picking action by applying pressure between the citrus fruit and the tree. Of equal importance is that the picking members not securely engage either the branches or the leaves. Secure engagement of these objects can cause damage to the tree.

To these ends, the picking member must have features which enable it to engage objects sliding along the picking arm. An engagement area will slidably engage an object having a diametric measurement smaller that the diametric measurement of the smallest target fruit. Release means will permit release of any object when a certain predetermined pressure is obtained. Reset means will immediately reset the picking member following utilization of the release means. Preferably, the picking member should provide for rotation prevention means to provide for the application of pressure between the citrus fruit and the stem without the citrus fruit rotating. The rotation prevention means prevents the fruit from turning to place the stem extending perfectly perpendicularly from the connection point on the fruit. This rotation prevention enables a sideways pulling to occur between the citrus fruit and the stem. This orientation requires less pressure to separate the citrus fruit from the stem. Pulling of citrus fruit when the stem extends perfectly perpendicularly requires significantly greater pressure. This orientation also has the tendency to damage either the tree, by breaking off small branches, or the citrus fruit, by ripping the skin around the stem. One enhancement is to have the picking member, or at least the engaging extension, angularly offset slightly from the longitudinal length of the picking arm.

The picking member may have a design such that it can engage and pick fruit during the insertion phase of the cyclical motion. While possible, this configuration is not recommended due to physical characteristics of trees, particularly citrus trees. Tree grow outward from a single trunk and quickly separate into many branches. These branches radially extend outward from the trunk and separate into more branches. Citrus fruit have a certain weight and tend to hang downward from one of the smaller branches. When one citrus fruit is secured and pressure is applied outward from the center of the tree, separation is the most likely outcome. On the other hand, when one citrus fruit is secured and pressure is applied inward toward the center of the tree, bending and possible breakage of the feeder branch is quite possible.

Referring now to FIG. 1, FIG. 2 and FIG. 13 through FIG. 16, a picking member 138 is shown secured to the distal end of picking arm 134. An insertion extension 140, having mounting apertures 142 incorporated thereon, is insertable into picking arm 134. Flush mount screws 144 engage mounting apertures 142 to secure picking member 138 to picking arm 134. A guide point 146 and an engaging extension 148 provide for penetration of tree 212 with minimal resistance. Following insertion, picking arm 134 is displaced to move the side of picking arm 134, having engaging extension 148 extending therefrom, into contact with branches 216. Following this gathering motion, picking arm 134 is withdraw while branches 216 are held against picking arm 134. This motion brings branch 216 into contact with an engaging surface 156. Due to the radial measurement of engaging surface 156, branches 216, having a relatively small radial measurement, may freely slide through picking member 138 without undue resistance. During this sliding engagement any fruit 218 attached to branch 216 comes into contact with engaging surface 156 and gripping occurs by the main body of picking member 138 and engaging extension 148. Pressure builds during further retraction of picking arm 134, until a picking pressure is obtained to separate fruit 218 from a stem 220.

Occasionally engagement of branch 216 will occur which will not slide through picking member 138. One such example is when engagement occurs to branch 216 in close proximity to separation from a larger branch and the orientation of branch 216 is relatively vertical. Another example occurs when intertwining of branch 216 occurs with other branches 216 which tend to anchor the free end of branch 216 so that free movement is not possible.

One method of providing for release is to make engaging extension 148 pivotal to the remainder of picking member 138. A one piece pliant material can be utilized to form picking member 138. This is particularly desirable due to the lack of moving parts which may engage and become entangled with branches 216. An opening 150, bordered by the body of picking member 138, a deflecting bridge 152 and an engaging bridge 154, permit this pivotal motion. FIG. 13 illustrates picking member 138 in the normal position. During release, as shown in FIG. 14, deflecting bridge 152 deforms into opening 150 while engaging bridge 154 stretches and straightens. Engaging extension 148 pivots to point toward the distal end of picking member 138 and release of branch 216 occurs during continued retraction of picking member 138. Following release of branch 216, engaging extension 148 returns to the normal position and is set to engage further branches 216 and fruit 218.

As exampled in FIG. 9, attachment of in line picking members 158, or obvious variations therefrom, may occur on picking arm 134. While two identical in line picking members 158 are shown, it is possible to have picking members having differing radial grasping measurements. One such example would have the nearest picking member to harvester 30 have the largest radial measurement, with a central picking member having a medium radial measurement and the picking member attached to the distal end have the smallest radial measurement. Using this example of three spaced picking members, and insertion placing all three picking members within the tree, the outermost area of the tree would have coverage by all three picking members following complete withdraw. The central coverage area would have coverage by the middle and end picking members. The inner area of the tree would have coverage by only the end picking member. This would be one way of compensating for the physical reality that the outer periphery of the tree holds the majority of the fruit.

With deployment of multiple picking members on a single picking arm care must be taken in placement and spacing. This is particularly important for the connection end near where engagement occurs with drive bar 82. During full release by anchoring member 108 it would be undesirable for contact to occur and insertion to resume. One solution would be to have an open design for drive bar 82 similar to the open design of guide member 128 top to permit passage of in line picking members 158.

Topping assembly

Due to the physical characteristics of citrus trees, a large quantity of fruit exist at the upper periphery of the tree where sunlight is plentiful. Attachment of an auxiliary assembly to harvester 30, shown in FIG. 2, to permit further lateral extension by picking arms to provide for proper and complete penetration of the upper extent of the tree.

Figure 3:
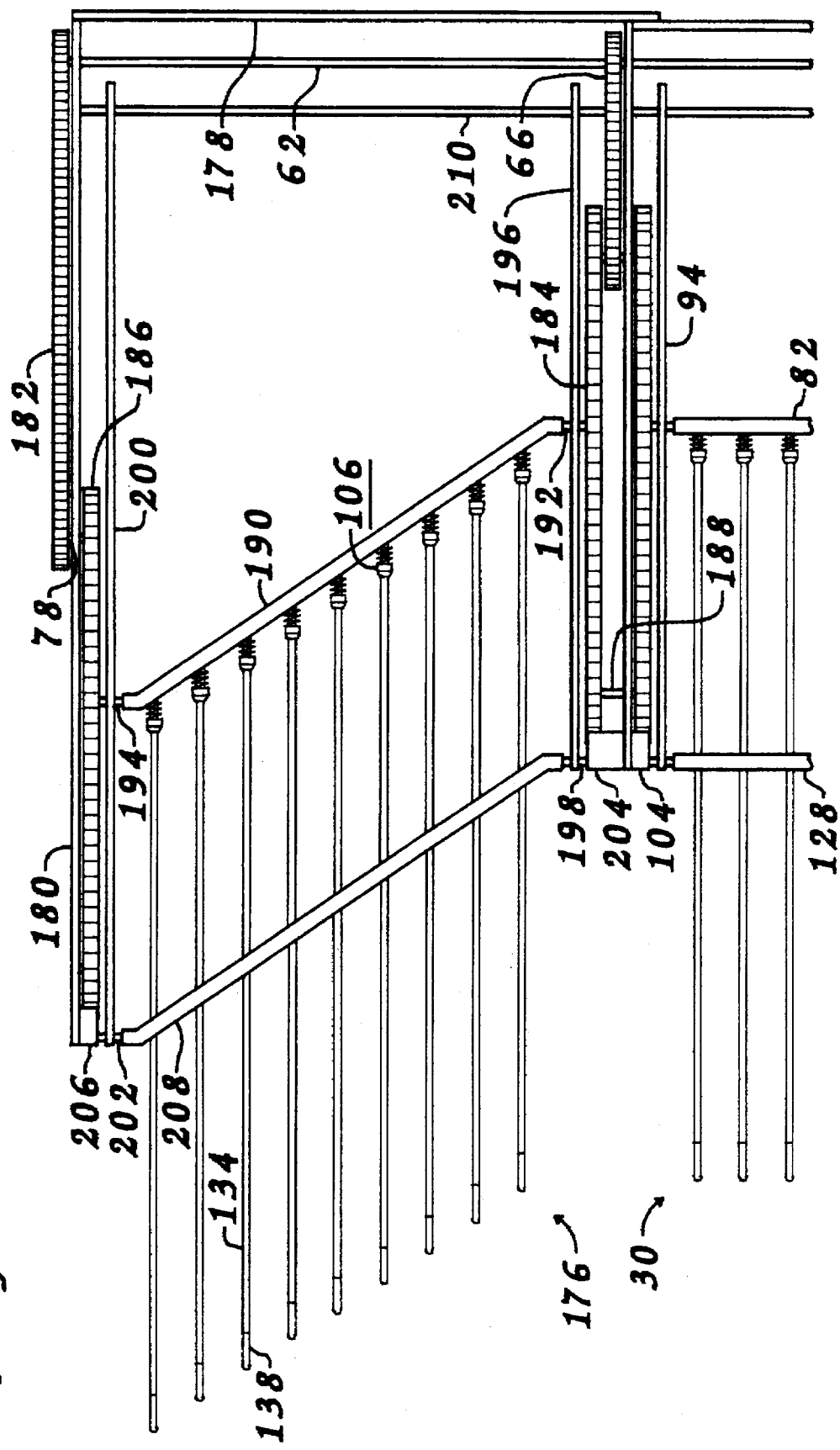
FIG. 3 is a front plan view of an auxiliary harvester.
Figure 5:
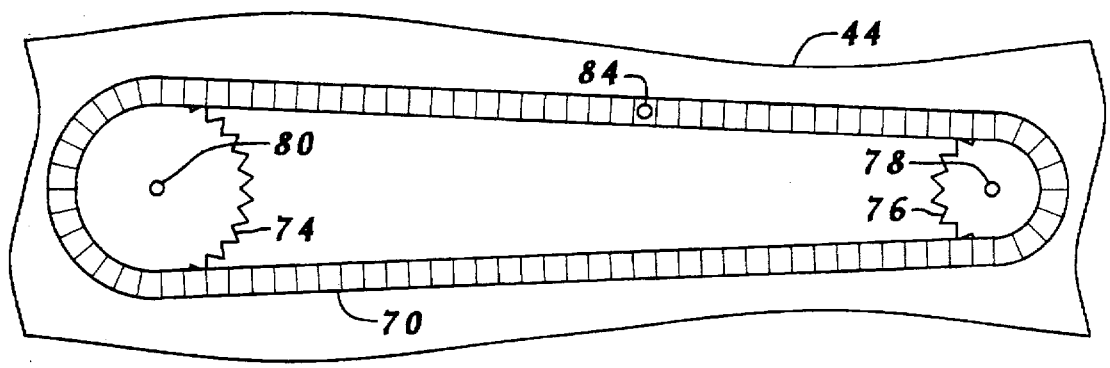
FIG. 5 is an overhead plan view as taken from the section line shown in FIG. 2.
Figure 4:
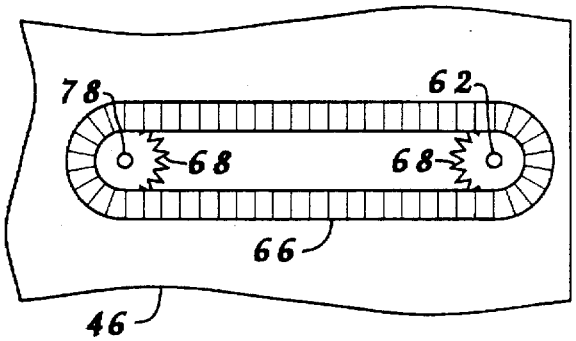
FIG. 4 is an overhead plan view as taken from the section line shown in FIG. 2.

FIG. 3 shows attachment of a topping assembly 176 to the upper extent of harvester 30. Upper transfer shaft 62 further transfers rotation to an auxiliary upper coupling chain 182. Auxiliary upper coupling chain 182 transfers rotation, using transfer shaft 78, to an auxiliary upper drive chain 186. Upper coupling chain 66, cooperating with an auxiliary support shaft 188, further transfers rotation to an auxiliary lower drive chain 184. Auxiliary upper drive chain 186 has rotatably mounted thereto an auxiliary upper anchor 194. Auxiliary lower drive chain 184 has rotatably mounted thereto an auxiliary lower anchor 192. An auxiliary frame wall 178 cooperates with an auxiliary upper frame plate 180 to provide for structural integrity of topping assembly 176. As disclosed above for harvester 30, opposing side plates, not shown, may be installed.

While auxiliary lower drive chain 184 and auxiliary upper drive chain 186 rotate in a synchronized manner, positioning of auxiliary upper drive chain 186 is significantly forward from auxiliary lower drive chain 184. Auxiliary lower anchor 192 penetrates an auxiliary lower pivot member 196, and is slidably held in a track, not shown. Auxiliary upper anchor 194 penetrates an auxiliary upper pivot member 200, and is slidably held in a track, not shown. Auxiliary lower anchor 192 and auxiliary upper anchor 194 rotatably connect to and carry an auxiliary drive bar 190. Auxiliary drive bar 190 has attached thereto a plurality of picking arms 134 each having one impact absorbing member 106, having features previously disclosed.

Auxiliary lower pivot member 196 and auxiliary upper pivot member 200 each have one end pivotally connector to an auxiliary pivot anchor 210. Auxiliary lower pivot member 196 has attached to the opposing end an auxiliary lower sliding anchor 198. Auxiliary lower sliding anchor 198 has one end slidably mounted within a track, not shown, of an auxiliary lower track housing 204, with the other end secured to an auxiliary guide member 208. Auxiliary upper pivot member 200 has attached to the opposing end an auxiliary upper sliding anchor 202. Auxiliary upper sliding anchor 202 has one end slidably mounted within a track, not shown, of an auxiliary upper track housing 206, with the other end secured to auxiliary guide member 208.

As disclosed below, each subsequent picking arms 134 moving upward from the lowest to the highest will produce a slightly different pattern due to the increasing distance from auxiliary pivot anchor 210. Otherwise the operation of topping assembly 176 is similar to the disclosed operation of harvester 30 with an increasing extension penetration of the higher picking arms 134 and therefore the attached picking members 138.

Drive patterns and the resultant motion patterns

FIG. 17 and FIG. 18 are graphical representations of the drive assembly of harvester 30 previously disclosed, and a picking pattern made therewith, while in a stationary position. A drive point 224 is capable of being moved complete around a drive belt 222 in a repetitive manner. One complete rotation equals one motion cycle. While standing in a stationary position, drive point 224 forms a stationary drive pattern 226 during one cycle around drive belt 222.

A pivot point 236 is a fixed point with which all motions are linked. Stationary drive pattern 226 has a drive point lateral retracted extent 228, an advance midpoint 230, a drive point lateral extended extent 232 and a retract midpoint 234. Moving from pivot point 236 to a tangent point on stationary drive pattern 226 and extending beyond we reach a guide lines insertion side extent 240. Moving from pivot point 236 on the opposing side of stationary drive pattern 226 to a tangent point on stationary drive pattern 226 and extending beyond we reach a guide lines retraction side extent 242. Connecting guide lines insertion side extent 240 and guide lines retraction side extent 242 and maintaining a fixed spacing from pivot point 236 is a pivotal arc 238.

Picking arms, not shown, are carried and anchored to drive point 224 and extend toward pivotal arc 238 while being secured to pivotal arc 238 in a slidable engagement. This connection between drive point 224 and a movable point on pivotal arc 238 will always intersect, with extension beyond drive point 224, pivot point 236. Therefore, during a cycle of motion around stationary drive pattern 226 the movable point on pivotal arc 238 will extend from a fixed point on pivotal arc 238, contact both guide lines insertion side extent 240 and guide lines retraction side extent 242 and return to the original fixed point.

An extension anchored to drive point 224 and slidably engaging the movable point on pivotal arc 238 and extending from drive point lateral retracted extent 228 to an arms lateral retracted extent 254 will form stationary pattern 244 during one cycle of motion around stationary drive pattern 226. Drive point 224 moves from drive point lateral retracted extent 228 through advance midpoint 230 to drive point lateral extended extent 232. During this movement the distal end of the extension previously described would move from arms lateral retracted extent 254 along an insertion side 246 through an insertion midpoint 256 to an arms lateral extended extent 258 at an inner side 246 along stationary pattern 244. Drive point 224 moves from drive point lateral extended extent 232 through retract midpoint 234 to drive point lateral retracted extent 228. During this movement the distal end of the extension previously described would move from arms lateral extended extent 258 along a withdraw side 250 through a retraction midpoint 260 to arms lateral retracted extent 254 at an outer side 252 along stationary pattern 244. These motions would bring the distal end of the extension back to a same point from which it began the cycle. One such cycle would form a gathering area 262.

The above description for FIG. 17 and FIG. 18 explain a stationary transference. FIG. 19 and FIG. 20, using the same components defined for FIG. 17, further add the physical motion of the entire assembly during one cycle of motion. A machine cycle line 274 represents the travel distance of the machine during one cycle and this measurement will be defined as one unit of measurement. A cycle beginning position 270 begins the cycle of motion while a cycle ending position 272 ends the cycle of motion.

Referring back to FIG. 17 with reference to FIG. 19, pivot point 236 would move from cycle beginning position 270 to cycle ending position 272 during one cycle. Drive belt 222 would advance along relative to machine cycle line 274 while drive point 224 makes one cycle of motion around drive belt 222.

A cycling drive pattern 264 begins with a drive point beginning position 266 and ends with a drive point ending position 268 as drive point 224 moves through one cycle of motion. Drive point 224 crosses a crossover point 276 twice during one cycle of motion. Drive point beginning position 266 is spaced exactly one unit of measurement from drive point ending position 268.

As pivot point 236 advances along machine cycle line 274 and drive point 224 moves along cycling drive pattern 264 the previously described extension forms a cycling pattern 278, shown in FIG. 20. During usage a series of cycles would be performed in a continuous repetitive manner to conduct the harvesting of fruit.

Now comparing stationary pattern 244, shown in FIG. 18, and cycling pattern 278, shown in FIG. 20, it is noted that the introduction of motion has shortened an outer side 286 compared to outer side 252. An inner side 282 has not been shortened proportionally compared to inner side 248. This is due to the fact that very little motion along machine cycle line 274 occurred during formation of inner side 282 while one unit of measurement pass before the completion of outer side 286, reducing it by a like amount. Additionally, an insertion side 280 has been straightened compared to insertion side 246 as is a withdraw side 284 compared to withdraw side 250. A comparison of the measurement of the distance between insertion midpoint 256 and retraction midpoint 260 and the measurement of the distance between an insertion midpoint 290 and a retraction midpoint 294 reveals that the former is approximately one half of one unit of measurement greater than the latter. A comparison of the measurement of the distance between an arms lateral retracted extent 288 and an arms lateral extended extent 292 and the measurement of the distance between arms lateral retracted extent 254 and arms lateral extended extent 258 reveals that these two measurements are approximately equal.

A gathering area 296 represents the area of picking during one cycle. With the desire being to present a completely overlapping coverage, so that all target areas within the tree be covered twice, the minimum width measured from insertion side 280 to withdraw side 284 is at least two units of measurement.

Figure 21:
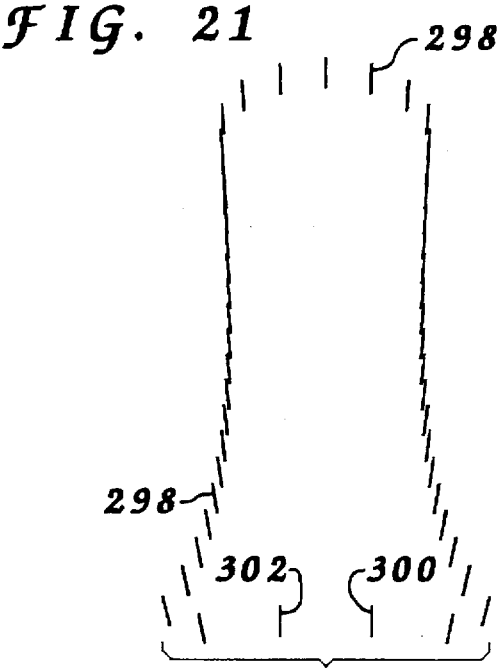
FIG. 21 is an overhead plan view representing motion of the end of one picking arm through one motion cycle.

FIG. 21 represents distal ends 298 of the extension described above for FIG. 17 through FIG. 20 when forming cycling pattern 278, shown in FIG. 20. Assuming that machine cycle line 274 has a measurement of twelve, (12), inches, one complete cycle occurs during each twelve, (12), inches of forward travel of the harvester, not shown. The forty-nine, (49), distal ends 298 present an illustration representing the spacial positioning, and directional orientation, during motion through one cycle. One distal end 298 is shown for each quarter, (¼), inch of harvester advance motion through the complete cycle of twelve, (12), inches from a beginning position 300 to an ending position 302. One complete cycle beginning at beginning position 300, going complete around once, passing beginning position 300 and ending at ending position 302. Ending position 302, being the forty-ninth, (49th), position is also the beginning position of the next cycle. Each illustrated distal end 298 would extend back to drive point 224, shown in FIG. 19.

Figure 23:
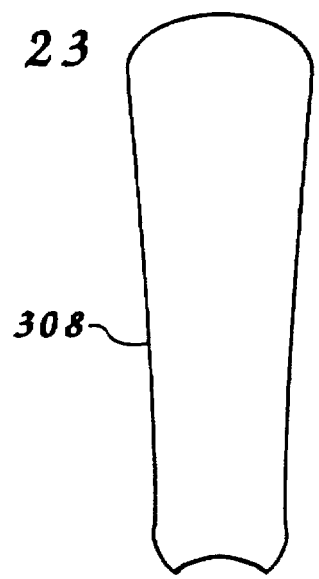
FIG. 23 is an overhead plan view representing a pattern associated with the motion pattern shown in FIG. 22.
Figure 22:
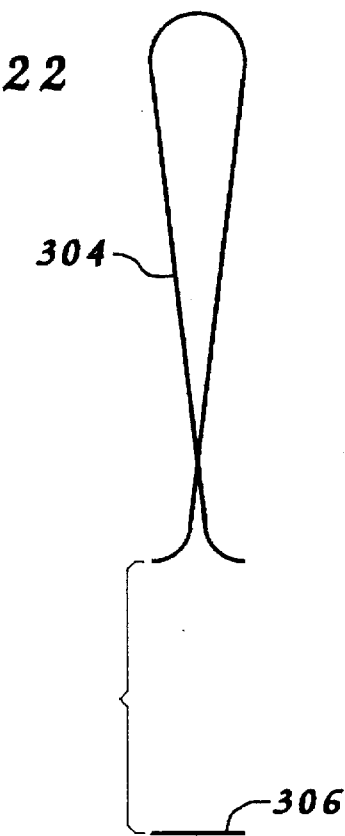
FIG. 22 is an overhead plan view representing a motion pattern.

FIG. 22 represents formation of a cycling drive pattern 304 by auxiliary upper drive chain 186, shown in FIG. 3. Cycling drive pattern 304 is identical to cycling drive pattern 264, shown in FIG. 19. A machine cycle line 306 is spaced approximately three times as far from cycling drive pattern 304 as machine cycle line 274 is spaced from cycling drive pattern 264, shown in FIG. 19. FIG. 23 represents formation of a cycling pattern 308 by the uppermost picking member 138 shown in FIG. 3. The relationship of the spacing of the various machine cycle lines to their respective cycling drive pattern have an obvious effect upon the respective cycling pattern formed therewith.

In groves where the citrus crop is extremely dense, a shorter cycling may be desired, as exampled by one cycle for each six, (6), inches of machine advance. Similarly, it may be desired to expand the cycling pattern on the machine side to provide more overlapping on the outer periphery of the tree. Someone with ordinary skill in the art, using the principals explained herein, would be capable with minor experimentation, of designing a machine having any desired pattern.

Specific dimensioning of the example machine

The example harvester provides for a range of motion of the drive bar of six, (6), feet from fully retraction to fully extension. The cycling distance is such that a full cycle of motions occur once for each twelve, (12), inches of forward travel of the machine. Therefore, for every twelve, (12), inches of advance of the machine the picking arms will move from a beginning position to be extended out six, (6), feet, be displaced by at least two, (2), feet, be retracted six, (6), feet and be advanced to a new beginning position, being twelve, (12), inches beyond the previous beginning position. This pattern is shown in FIG. 20.

The rearward pivot point of the picking arms, being pivot anchor 98, is set back twelve, (12), inches from the nearest approach of the pivot point of the drive bar. The forward pivot point of the picking arms, being guide member 128, is set forward six, (6), inches from the nearest approach of the pivot point of the drive bar. Guide member 128 moves along within the arcs of the opposing tracks and remains a stationary seven and a half, (7½), feet from the rearward pivot point, being pivot anchor 98. The picking arms have an overall length of seven, (7), feet from the contact with the drive bar to the distal end, inclusive of the picking member.

The sizing of the gears, 74 and 76, and the sizing of the drive chains, 70 and 72, cooperate to provide for a relational positioning of the anchors, 84 and 86 during each cycle of motion. The maximum range of motion of the anchors, 84 and 86, is six, (6), feet. The range of motion through a cycle of motion of the center of the anchors measure directly across the center of the axle of the gears, 74 and 76, and perpendicular to the maximum range of motion is fourteen, (14), inches on forward drive gear 74 and nine, (9), inches on rearward drive gear 76.

Using this specific example dimensions, and the principles disclosed herein, anyone with ordinary skill in the art may construct numerous harvesters capable of producing specifically desired picking patterns having a desired coverage pattern, a desired penetration and a desired travel distance between cycles.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and according, all suitable modifications and equivalents may be resorted to, falling with the scope of the invention.

I claim:

1. A machine to pick citrus fruit comprising:
    a) a plurality of picking arms arranged in spaced relationship and extending from the machine;
    b) motion generation means to provide for a series of motions performed repetitively wherein each of the picking arms further comprise a terminal end and the series of motions of the motion generation means produces an elliptical pattern of motion to the terminal ends of the picking arms, the series of motions comprising:
        1) an insertion motion to provide for moving the picking arms inward on one of the citrus trees of a row of trees;
        2) an engaging motion to provide for moving the picking arms to engage branches of the citrus tree following the insertion motion;
        3) a withdraw motion to provide for moving the picking arms outward on the citrus tree while engaging the branches following the engaging motion;
    the series of motions of the motion generation means to provide for coverage of an elevational section of each of the trees by each of the picking arms;
    c) a plurality of engaging members, one of the engaging members attached to each of the picking arms to provide for a slidable engagement of the branches of the tree and to firmly engage the citrus fruit attached to the branches to impart a picking pressure between the citrus fruit and the branch to disengage the citrus fruit from the branch during the withdraw motion;
    whereby the plurality of spaced picking arms engage the branches following the engaging motion and during the withdraw motion bring citrus fruit into engagement by one of the engagement members to impart the picking pressure to disengage the citrus fruit from the branch.

2. The machine defined in claim 1 wherein each of the engaging members comprise a one piece flexible resilient hook shaped unit.

3. The machine defined in claim 1 wherein the engaging members are attached to the picking arms extending from a terminal end of the picking arms distal from the transport device of the machine.

4. The machine defined in claim 1 wherein the machine further comprises transport means to provide for continuous motion of the machine along a row of trees during operation of the machine and the motion generation means further produces an overlapping picking coverage during the continuous motion along the row of trees, whereby the withdraw motion occurs in a spacial location on the tree behind the spacial location of the insertion motion of the previous series of motions and each section of each tree is subjected to coverage by sections of two performances of the series of motions.

5. The machine defined in claim 1 further comprising a pivot member pivotally attached to the machine and slidably contacting the picking arms between a first end and a second end of each of the picking arms, the pivot member to provide for guiding each picking arm during the series of motions of the motion generation means.

6. A harvesting machine to harvest a citrus tree, the citrus tree comprising a plurality of elongated objects and citrus fruit, the elongated objects comprising a plurality of branches and a plurality of stems, each stem protruding from one of the branches, the citrus fruit attached to one of the respective stems, the harvesting machine to disengage the citrus fruit from the respective stem, the harvesting machine comprising:
  a) a transport device to provide for travel of the harvesting machine adjacent to a row of trees;
  b) a plurality of picking arms, each picking arms having a connection end, a distal end and a range of lateral motion, the range of lateral motion having a retracted spacing and an extended spacing, the retracted spacing and the extended spacing both relative to the harvesting machine, the plurality of picking arms arranged in a spaced elevational relationship and extending sideways from the harvesting machine;
  c) picking motion means to provide for imparting a series of motions repetitively to each of the picking arms, the series of motions comprising:
    1) an advancing motion to provide for movement of the picking arm from the retracted spacing of the range of lateral motion to the extended spacing of the range of lateral motion;
    2) an engaging motion to provide for a displacement of the distal end of the picking arm while in the extended spacing of the range of lateral motion, the engaging motion to provide for bringing the distal end of the picking arm into contact with the elongated objects of the citrus tree;
    3) a retracting motion to provide for movement of the picking arm from the extended spacing of the range of lateral motion to the retracted spacing of the range of lateral motion;
  d) a plurality of engagement members, one of the engagement members attached to the distal end of each of the picking arms, each engagement member to provide for a slidable engagement of at least one of the elongated objects during the retracting motion of the series of motions, each engagement member to provide for a grasping of the citrus fruit connected to the elongated object and to apply a pressure to separate the citrus fruit from the respective stem, each engagement member to provide for a resistance release means for disengagement of the elongated object when a predetermined pressure threshold is obtained;
whereby each engagement member engages at least one of the elongated objects, slides along the elongated object, grasps the citrus fruit and applies pressure to separate the citrus fruit from the stem while providing for disengagement of the elongated object when the predetermined pressure threshold is obtained.

7. The harvesting machine defined in claim 6 wherein each of the engagement members comprises a hook shaped unit, the hook shaped unit being one piece, flexible and resilient.

8. The harvesting machine defined in claim 6 wherein one of the engagement members extends from the distal end of each of the picking arms.

9. The harvesting machine defined in claim 6 wherein a plurality of engagement members are attached in spaced relationship on each of the picking arms.

10. The harvesting machine defined in claim 6 further comprising a pivot member pivotally attached to the harvesting machine and slidably contacting the picking arms between the connection end and the distal end of each picking arm, the pivot member to provide for guiding each picking arm during the series of motions of the picking motion means.

11. The harvesting machine defined in claim 6 wherein the harvesting machine continuously advances during picking along a direction of travel and the picking motion means is controlled by a drive member, the direction of travel parallel to a row of citrus trees, the drive member producing an elliptical pattern for transfer to the picking arms, the elliptical pattern performed repetitively and comprising:
  a) a lateral advance to provide for directional movement of the picking arms relative to the harvesting machine to produce the advancing motion, the directional movement of the picking arms being away from the harvesting machine, the lateral advance having a travel distance measurement, the travel distance measurement of the lateral advance sufficient to provide for entry into the citrus tree by the picking arms;
  b) a longitudinal retraction to provide for direction movement of the picking arms relative to the harvesting machine to produce the engaging motion, the directional movement of the picking arms being in an opposing direction to the direction of travel of the harvesting machine, the longitudinal retraction having a travel distance measurement, the travel distance measurement of the longitudinal retraction sufficient to provide for at least the distal end of the picking arm to come into contact with elongated objects of the citrus tree;
  c) a lateral retraction to provide for direction movement of the picking arms relative to the harvesting machine to produce the retracting motion, the directional movement of the picking arms being toward the harvesting machine, the lateral retraction having a travel distance measurement, the travel distance measurement of the lateral retraction sufficient to provide for picking of the citrus fruit;
  d) a longitudinal advance to provide for directional movement of the picking arms relative to the harvesting machine, the directional movement of the picking arms being in the direction of travel of the harvesting machine;
whereby the harvesting machine advances along the row of citrus trees and picks the citrus fruit by repetitively; laterally advancing the picking arms into each of the citrus trees, longitudinally retracting the picking arms against the elongated objects, laterally retracting the picking arms outward from the citrus tree to cause the engagement members to slidably engage the respective citrus fruit and apply pressure to disengage the citrus fruit from the respective stem and longitudinally advancing the picking arms to a new entry position along the row of citrus trees.

12. The harvesting machine defined in claim 6 further comprising transport means and timing means, the transport means to provide for propelling the harvesting machine along a course at a speed, the course along a row of citrus trees, the timing means to regulate the series of motions of the picking motion means relative to the speed of the harvesting machine, the timing means causing the series of motion to further comprise an overlapping pattern, the overlapping pattern to provide for each series of motions of the picking motion means to partially overlap the previous series of motions of the picking motion means, whereby overlapping coverage is provided for each area of the citrus tree.

13. The harvesting machine defined in claim 6 further comprising resistance compensation means to provide for an isolated pause of separate picking arms during the advancing motion of the series of motions of the picking motion means if resistance is met, whereby resistance caused by impact with the elongated objects results in pause of advance of the impacting picking arm to prevent injury to the citrus tree.

14. A citrus harvesting machine to harvest a citrus tree, the citrus tree comprising a plurality of elongated objects and citrus fruit, the elongated objects comprising a plurality of branches and a plurality of stems, each stem protruding from one of the branches, each of the citrus fruit attached to one of the respective stems, the citrus harvesting machine having a direction of travel relatively parallel to a row of citrus trees, the citrus harvesting machine to disengage the citrus fruit from the respective stem on the respective citrus tree during continuous forward movement along the direction of travel, the citrus harvesting machine comprising:

a) transport means to provide for controlled motion in the direction of travel;

b) a plurality of picking arms, each picking arms having a connection end, a distal end and a range of lateral motion, the range of lateral motion having a retracted spacing and an extended spacing, the plurality of picking arms arranged in a spaced elevational relationship with the distal end extending from the citrus harvesting machine for insertion into the row of citrus trees;

c) elongated motion means to provide for a series of motions, the series of motions performed repetitively and comprising:

1) a lateral advance to provide for directional movement of the picking arms relative to the citrus harvesting machine, the directional movement of the picking arms being away from the citrus harvesting machine, the lateral advance having a travel distance measurement, the travel distance measurement of the lateral advance sufficient to provide for entry into one of the citrus tree of the row of citrus trees by the picking arms;

2) a longitudinal retraction to provide for directional movement of the picking arms relative to the citrus harvesting machine, the directional movement of the picking arms being in an opposing direction to the direction of travel of the citrus harvesting machine, the longitudinal retraction having a travel distance measurement, the travel distance measurement of the longitudinal retraction sufficient to provide for at least the distal end of the picking arm to come into contact with elongated objects of the citrus tree;

3) a lateral retraction to provide for direction movement of the picking arms relative to the citrus harvesting machine, the directional movement of the picking arms being toward the citrus harvesting machine, lateral retraction having a travel distance measurement, the travel distance measurement of the lateral retraction sufficient to provide for picking of the citrus fruit;

4) a longitudinal advance to provide for direction movement of the picking arms relative to the citrus harvesting machine, the directional movement of the picking arms being in the direction of travel of the citrus harvesting machine, the longitudinal advance having a travel distance measurement;

d) a plurality of engagement members, at least one of the engagement members attached in close proximity to the distal end of each of the picking arms, each engagement member to provide for a slidable engagement of at least one of the elongated objects during the lateral retraction of the series of motions, each engagement member to grasp the citrus fruit connected to the elongated object, each engagement member to provide a resistance release means, the resistance release means to provide for disengagement when a predetermined pressure threshold is obtained;

whereby each engagement member engages at least one of the elongated objects, slide along the elongated object, grasp the citrus fruit and apply pressure to separate the citrus fruit from the stem while providing for disengagement when the predetermined pressure threshold is obtained.

15. The citrus harvesting machine defined in claim 14 wherein the series of motion of the elongated motion means further comprise an overlapping pattern, the overlapping pattern to provide for each series of motions of the elongated motion means to partially overlap the previous series of motions of the elongated motion means, whereby overlapping coverage is provided for each area of the citrus tree.

16. The citrus harvesting machine defined in claim 14 further comprising a pivot member pivotally attached to the citrus harvesting machine and slidably contacting the picking arms between the connection end and the distal end of each picking arm, the pivot member to provide for guiding each picking arm during the series of motions of the elongated motion means.

17. The citrus harvesting machine defined in claim 14 wherein each picking arm further comprises insertion pause means and insertion continue means, the insertion pause means to provide for a pause of the forward insertion if an insertion resistance is encountered, the insertion resistance having a predetermined minimum pressure threshold, the insertion continue means to provide for a continuation of the advance if the insertion resistance reduces below the predetermined minimum pressure threshold; whereby damage to the tree is prevented by suspending insertion if resistance is encountered and continue insertion if resistance subsides.

18. The citrus harvesting machine defined in claim 17 wherein each picking arm further comprises insertion stop means and reset means, the insertion stop means to provide for a termination of the forward insertion if the insertion resistance encountered reaches a predetermined maximum pressure threshold, the maximum pressure threshold having a greater measurement than the measurement of the minimum pressure threshold, the reset means to provide for a resetting of the picking arm following the lateral retraction of the series of motions of the elongated motion means; whereby damage to the tree is prevented by terminating insertion if continued resistance is encountered by the picking arm and reset following completion of the series of motions.

* * * * *